United States Patent [19]

Ray

[11] Patent Number: 5,290,584
[45] Date of Patent: * Mar. 1, 1994

[54] METHOD OF PREPARING A SNACK FOOD JERKY PRODUCT

[75] Inventor: Earl E. Ray, Las Cruces, Mexico

[73] Assignee: New Mexico State University Technology Transfer Corp., Las Cruces, N. Mex.

[*] Notice: The portion of the term of this patent subsequent to Feb. 1, 2011 has been disclaimed.

[21] Appl. No.: 946,875

[22] Filed: Sep. 16, 1992

Related U.S. Application Data

[63] Continuation-in-part of Ser. No. 918,893, Jul. 20, 1992, abandoned, which is a continuation of Ser. No. 761,401, Sep. 17, 1991, abandoned.

[51] Int. Cl.$^5$ .................. A23L 1/314; A23L 1/317; A23L 1/2165
[52] U.S. Cl. .................. 426/637; 426/448; 426/513; 426/516; 426/646
[58] Field of Search ............ 426/641, 646, 513, 448, 426/417, 637, 512, 516, 615

[56] References Cited

U.S. PATENT DOCUMENTS

| | | | |
|---|---|---|---|
| 3,447,929 | 6/1969 | Hale . | |
| 3,753,729 | 8/1973 | Harms et al. . | |
| 3,849,582 | 11/1974 | Blagdon et al. . | |
| 3,908,025 | 9/1975 | Miller et al. | 426/623 |
| 3,917,876 | 11/1975 | Harwood et al. | 426/585 |
| 3,968,269 | 7/1976 | Payne et al. | 426/629 |
| 4,262,028 | 4/1981 | Meyer et al. | 426/417 |
| 4,384,009 | 5/1983 | Lewis et al. | 426/646 |
| 4,623,548 | 11/1986 | Willard | 426/559 |
| 4,743,461 | 5/1988 | Gellman et al. | 426/549 |
| 4,868,002 | 9/1989 | Scaglione et al. | 426/641 |
| 4,910,038 | 3/1990 | Ducharme | 426/641 |
| 5,026,572 | 6/1991 | Neiberger | 426/641 |

FOREIGN PATENT DOCUMENTS

| | | | |
|---|---|---|---|
| 694276 | 9/1964 | Canada | 426/448 |
| 131701A | 1/1985 | European Pat. Off. | 426/637 |
| 1310348 | 3/1973 | United Kingdom . | |

OTHER PUBLICATIONS

"Development and Evaluation of Expanded Snack Foods Containing Mechanically Separated Meat (Beef)" by Earl E. Ray et al., Livestock Research Briefs and Cattle Growers' Short Course, NMSU Publication, p. 45 (Apr. 15, 1989).

"Extrusion of Nutritious, Meat Containing Snack Food" by E. E. Ray et al., Livestock Research Briefs and Cattle Growers' Short Course, NMSU Publication, p. 45 (Mar. 21, 1991).

"Optimum Extrusion Processing Conditions to Produce an Expanded Beef-Snack" by Kimberly C. Hren et al., Livestock Research Briefs and Cattle Growers' Short Course, NMSU Publication, p. 25 (Mar. 22, 1990).

(List continued on next page.)

*Primary Examiner*—Arthur L. Corbin
*Attorney, Agent, or Firm*—Donovan F. Duggan; Rod D. Baker

[57] ABSTRACT

A method of preparing and producing a nutritious, low calorie, low cholesterol, shelf-stable, expanded snack food product for humans and pets is disclosed. The process involves using a proteinaceous material, such as raw comminuted meats or mechanically separated meats, that are frozen or chilled. Prior to using the raw, frozen or chilled meat, it is further comminuted to relatively small particle size to provide optimum dispersion of the meat products with the farinaceous (starch) component of the mixture. This blend containing the raw, frozen or chilled meat products, is mixed with pregelatinized flour and is then subjected to elevated temperatures and shear pressure as it moves through the high-temperature, short-time, screw-type extruder. Flavorings, coloring, spices, and the like, may be blended with the ingredients or may be topically applied to the extrudate prior to packaging and after cutting to desired lengths.

15 Claims, No Drawings

OTHER PUBLICATIONS

"Properties of an Extruded, Expanded Snack Food Containing Meat and Potatoes" by E. E. Ray et al., Livestock Research Briefs and Cattle Growers' Short Course, NMSU Publication, p. 55, (Mar. 26, 1992).

"Continuous Production of a Synthesized Jerky Using a High-Temperature, Short-Time (HTST) Food Extruder" by E. E. Ray et al., Livestock Research Briefs and Cattle Growers' Short Course, NMSU Publication, p. 56 (Mar. 26, 1992).

"Effects of salt and storage characteristics of an expanded snack food containing mechanically separated beef (MSB) and potato flour," by D. A. Shaw et al., *Abstract*, Amer. Cos. Anim. Sci., vol. 387, p. 341 (Aug. 6–9, 1991).

"Final report for the project entitled: Development and Evaluation of Expanded Snack Foods Containing Mechanically Separated Meat (Beef)" by Dr. Earl E. Ray, College of Agriculture and Home Economics, *Memorandum*, pp. 1–16 (Oct. 16, 1990).

METHOD OF PREPARING A SNACK FOOD JERKY PRODUCT

CROSS-REFERENCE TO RELATED APPLICATIONS

This application is a continuation-in-part application of U.S. patent application Ser. No. 07/918,893, entitled Snack Food Product and Method of Preparation Thereof, to Ray, filed on Jul. 20, 1992, now abandoned, which was a continuation application of patent application Ser. No. 07/761,401, entitled Snack Food Product and Method of Preparation Thereof, to Ray, filed on Sep. 17, 1991, now abandoned, the teachings of which are incorporated herein by reference.

BACKGROUND OF THE INVENTION

1. Field of the Invention (Technical Field)

The invention relates to a snack food composition and method of making such composition.

2. Background Art

There are numerous processes for producing snack food products for the consumer, including consumers' pets. Many of these products are deep-fat fried in order for the product to expand and result in a puffed product. Needless to say, this method of deep-fat frying has the disadvantage of absorbing large amounts of fat, resulting in a product with high caloric content which many consumers do not find acceptable.

There also are a number of methods to make jerky using beef and turkey. Many have attempted to produce a jerky-like product utilizing less expensive protein sources than those who use primarily skeletal muscle tissue as their raw material. Many of the methods now employed in industry results in a jerky that may be undesirable in that it crumbles easily or results in products that look machine-made, seems artificial or has a "plastic" looking exterior which do not have the distinct rugged appearance of natural jerky.

U.S. Pat. No. 3,849,582, entitled Fortified Snack Process and Product, to Blagdon, et al., describes a process for producing low calorie snack food products which involves fortifying carbohydrate materials that have been substantially pregelatinized with a protein material which has not been substantially heat gelled. The protein source may be any high purity proteins, for example, milk, egg, or oilseed proteins. Blagdon, et al., also use a starch modifying and complexing agent, such as a saturated monoglyceride material, to prevent the hydration of the starch molecule by water. The shaped product is then converted to a snack food product, preferably by frying, since the heating step also serves to set or heat-gel the protein source. The moisture content of the cooked product ranges from 2-6% by weight; protein content ranges from 16-25% by weight; starch content ranges from 49-56% by weight; and the fat content ranges between 12% and 35% by weight.

U.S. Pat. No. 3,447,929, entitled Method of Manufacturing a Meat-Containing Expanded Food Product, to Hale, et al., describes a method of producing a meat-containing expanded food product directly from proteinaceous material, such as raw meat, that has been heated and dried to decrease its moisture to a value between 20% and 40%, and which also has been ground to reduce the particle size. The ground material is then subjected to elevated temperatures and pressure using an extruder to cook the dried meat. A farinaceous material component may be combined with the dried meat. The expanded cooked meat material is broken into pellets and further drying of the pellets is required.

U.S. Pat. No. 3,753,729, entitled Method for Preparing Food Snack Compositions, to Harms, et al., also proposes a process that involves adding a mixture of a starch material and fatty glyceride through a hopper into a housing containing a screw, and thereafter forces the mixture through a small orifice that may be one of many shapes. A puffed product containing granulated starch material is produced having an abrasion rating of less than 30%; 50% of the material would pass through a sieve screen having a 0.0041 inch opening, and contains between 10% and 15% moisture. The starch materials used may be an acid-modified starch derived from corn, white milo, or dehulled and degerminated corn. No meat, either raw, dried, or frozen, is used in this method.

The process used in U.S. Pat. No. 4,262,028, entitled Composition Containing Animal Parts for Production of a Pried Snack Food and Method for Production Thereof, to Meyer, et al., also requires drying raw animal parts to a relatively low moisture content, comminuting those animal parts to a relatively small particle size, and mechanically defatting the animal particles to a reduced fat (less than 15-18%) content. It is also disclosed that the animal parts may comprise no more than 25% hot oil rendered parts in order to avoid problems in gelatinization of the animal parts. The animal parts may be chosen from a wide variety of high collagen content meat parts. However, the most preferable animal parts are conventional green pork skins, in part rendered pork skins, bacon or ham rinds, connective tissue, cartilage, and intestinal tract tissue. It is only necessary that the total mixture of animal parts have a relatively high average collagen content. The moisture content of the animal parts must be reduced to less than 35% by air, smoke, or the like, at a preferred drying temperature between 212° F. and 275° F., for less than five hours. After appropriate drying, the animal parts are preferably comminuted, and it is also preferred that the dried material be cooled prior to comminuting. The animal parts must be reduced in fat content by rendering or mechanical defatting in order to accomplish sufficient gelatinization in the extruder, and mechanical defatting is preferred over hot oil rendering.

U.S. Pat. No. 4,623,548, entitled Method for Preparing Extruded Fried Snack Products from Corn and Other Cereal Flours, to Willard, teaches an expanded, fried cereal-based snack product comprising essentially (1) a low water-absorbing component, (2) a high water-absorbing component, and (3) a starch component comprising one or more ungelatinized starches, comprising from about 10% to 45% by weight, of the total dry solids. This invention uses only cereals, preferably corn, to make an expanded snack which needs frying and does not contain any meat in its composition.

Canadian Patent No. 694,276, entitled Farinaceous Animal Food, to Burgess, et al., likewise contains no meat and comprises a pet food prepared by high temperatures "substantially above 212° F."

U.S. Pat. No. 3,908,025, entitled Pet Food Product and Method for Forming Same, to Miller, et al., also teaches a pet food composition requiring temperatures above 212° F.

European Patent No. EP 0 131 701 to Rapp teaches an extruded potato chip composition comprising potato powder, ballast, and seasonings. No meat products are used in the product.

U.S. Pat. No. 3,917,87, entitled Process for Production of a Simulated Meat Product, to Harwood et al., describes a process for preparing a puffed or expanded food product simulating meat in which protein materials are mixed with water and a lubricating substance (edible fats and oils) prior to subjecting the mixture to the pressure sufficient to convert it into a plastic condition. The product is extruded first without puffing, then placed in a confined space and subjecting the extrudate for a specific time/pressure to cause it to puff and resemble meat.

U.S. Pat. No. 3,968,269, entitled Protein Food Product and Method of Making, to Payne et al., describes a process in which a mixture of high proteins oilseed materials and a meat source are combined followed by extrusion of said mixture to form a porous, expanded food product.

U.S. Pat. No. 4,384,009, entitled Method of Manufacturing Dehydrated Meat Product, to Lewis et al., describes a method to produce an edible dehydrated meat product using raw, dried, semi-dried meat products mixed with vegetable material.

U.S. Pat. No. 4,868,002, entitled Process for Preparing a Meat Jerky Product, to Scaglione, et al., describes a process for making meat jerky using fiber-like or fibrous components of animal tissues (striated muscle) or from fibrous plants (wheat straw, alginates, or industrially generated fibers).

The process used in U.S. Pat. No. 5,026,572, entitled Jerky-style Pet Product, to Neiberger, describes a method for making a jerky-type product which uses multiple extrusion steps.

British patent No. 1,310,348 discloses a dehydrated product formed from raw/cooked meat and cooked dry starchy vegetables. The dehydrated meat products are prepared from comminuted raw/cooked meats by shaping and heat setting the comminuted meat and then drying the shaped and set meat.

Thus, the prior art has failed to provide a means of combining non-rendered, non-dried, raw, frozen or chilled comminuted meats and other similar meat products with farinaceous material components to form an expanded snack product that is nutritious, lower in calories than conventional snacks, is highly palatable, with a long, stable shelf life and which has a lower fat content and higher protein content than normally prepared fat-fried products.

The prior art similarly has failed to provide a means of combining a proteinaceous material, such as meat (frozen, unfrozen, dried and etc.) comminuted meats (all species/and other similar meat products/byproducts with farinaceous material components (flours, starches, meals, and etc.) and spices/flavors in a high temperature, short time food extruder to mix, cook, form, dry and expel through a ribbon die (flat) orifice an extrudate that is nutritious, palatable, shape sustaining, shelf-stable and which produces a finished product that is tough and has a chewy texture, consistency, and that does not require nitrite for preservation as is required by other jerky products.

SUMMARY OF THE INVENTION

The preferred method of the invention comprises a method of preparing a snack food comprising the steps of freezing or chilling fresh proteinaceous material, blending the chilled or frozen proteinaceous material with farinaceous material, and extruding the blended proteinaceous and farinaceous materials. The preferred method of the invention further comprises the steps of mechanically preparing and freezing or chilling selected meat products. The step of mechanically preparing selected meat products may further comprise the step of deboning selected meat products, mixing lean meat and fat or providing fat-reduced beef trimmings.

The preferred method of the invention further comprises the steps of comminuting the frozen or chilled proteinaceous material by grinding and subsequently storing the frozen or chilled proteinaceous material at a temperature within the range of 0°–5° C.

The preferred method of the invention further comprises the step of gelatinizing farinaceous material and heating and compressing the blended proteinaceous and farinaceous material. The preferred method of heating the blended proteinaceous and farinaceous material comprises the steps of heating the blended proteinaceous and farinaceous material above its heat of vaporization and subsequently expanding the blended proteinaceous and farinaceous material.

The preferred method of the invention further comprises the steps of seasoning and cutting the blended proteinaceous and farinaceous material.

The preferred composition of the invention comprises a blended extrudate of frozen or chilled defatted animal parts and starch. The preferred composition of the invention further comprises a moisture content of less than 20% by weight and in the range of between 10% and 15% for optimum expansion; a fat content of leas than 8% by weight with a preferred range of 3–6% for optimum expansion; a starch content of approximately 80–90% by weight prior to extrusion with a preferred range being between 85% and 88% starch content. The preferred composition of the invention further comprises raw defatted beef parts, and comminuted animal parts. The preferred composition of the invention further comprises potato flour and pregelatinized potato flour.

The preferred composition of the invention further comprises a blended extrudate comprising a moisture content of below approximately 9% by weight after extrusion with a preferred moisture content between 5.5% and 9% in the extrudate; a fat content of below 6% by weight after extrusion with a preferred fat content between 2% and 6% in the extrudate; a protein content of approximately 10–12% after extrusion with a preferred protein content between 10.5% and 12.5% in the extrudate; and a caloric content of less than approximately 105 calories per ounce with a preferred range of between 100 and 115 calories per ounce of extrudate.

The preferred composition of the invention further comprises less than approximately 1 mg of cholesterol for each 100 g of blended extrudate, and the blended extrudate expands at a ratio of at least approximately 4:1 with a preferred range of expansion ratio between 3.5:1 and 5:1.

An alternative embodiment of the invention comprises a jerky-like product and a method for preparing it. The alternative embodiment preferably comprises the steps of freezing and finely grinding or comminuting proteinaceous material. The comminuted proteinaceous material is blended with farinaceous material in a mixer, and then fed into a high-temperature, short-time food extruder, which extrudes a flat strip of jerky-like product. The extruder preferably is operated with a three-to-one screw compression ratio at around 160 rpm, such that little product expansion occurs, but a fully-cooked jerky-like product is produced. Seasonings may be added while blending the proteinaceous and farinaceous materials, or topically after extrusion.

More specifically, the alternative method of the invention comprises a method of preparing a jerky-like product which utilizes fresh, chilled, frozen, dried or semi-dried proteinaceous material, blending the ground/chopped, meat/meat by-product materials with the farinaceous materials (flours, flakes, starches and etc.) and seasonings using a Butcher ® ribbon-type mixer or a Hobart ® bowl mixer for about three minutes, depending upon the amount of raw materials to be mixed. These blended materials are then fed into the high temperature, short-time food extruder which extrudes a flat strip of blended proteinaceous, farinaceous, seasoned/flavored materials that is fully cooked (175°–180° F.) upon exiting the ribbon die nozzle. With a moisture content between 20–30%, the cooked extrudate has less likelihood of microbial contamination and needs no nitrite for preservation.

This alternative method of the invention may further comprise the steps of mechanically preparing, freezing or chilling, the deboned selected meat products (shanks, fat-reduced beef trimmings, chicken, turkey, and etc.), and the utilization of dried and semi dry meat products, as well as the utilization of meat by-products (spleen, lungs, liver, hearts and etc.) to produce items (i.e. "dog bones" and etc.) for the pet food market.

The alternative method of the invention further comprises the step of comminuting frozen meat and meat by-products. Alternatively, the meat may be chilled, dried, semi-dried, and/or low-temperature rendered (i.e. temperature is high enough to render the fat but does not denature the protein of the meat). These proteinaceous materials may be utilized immediately, or be chilled or frozen to be used at a later time. All ingredients utilized in formulating the jerky-like products and/or products of similar composition need to be very finely ground or chopped (comminuted) prior to being used, so that optimum dispersion of all ingredients can be obtained in the final blend. This blend should be refrigerated (0°–5° C.) during any holding period since the blend contains meat/meat by-products which could spoil if not refrigerated.

The alternative method of preparing a jerky-like product includes the step of gelatinizing farinaceous material and heating and compressing and forming the blended proteinaceous, farinaceous material, and flavors/seasonings. The preferred method of heating the blended proteinaceous, farinaceous, and seasonings comprises the steps of heating (electric, steam, or the like) the blended proteinaceous, farinaceous, and seasonings to denature the meat protein, gelatinize the farinaceous material and to ultimately result in a fully cooked jerky-like product upon exiting the flat/ribbon die opening that is flat, cooked, chewy and tasty.

Preparing the jerky-like product further comprises the steps of applying additional seasonings, further drying of product, if desired and cutting (longitudinally or laterally) the blended product into strips of the desired width and length.

The product composition of the this alternative method of the invention comprises a blend of frozen, chilled, semi-dried, dried or partially denatured animal parts and starches. The product has a moisture content of less than 60% by weight, and preferably in the range of between 20% and 50%, and more preferably in the range of 30–35% for optimum textured properties, storage capabilities and low microbiological organism counts. The product has a pre-extrusion fat content of less than 10% by weight with a preferred range of 3–10% for optimum textural properties, storage and a low calorie content. The jerky-like product produced by the alternative method has a starch content of approximately 40–80% by weight prior to extrusion, with a preferred range being (1) between 40–70% for the jerky-type product for human consumption and (2) between 65–80% for "dog bone" pet food products. The composition further comprises raw defatted beef parts, chicken parts, turkey parts, and comminuted parts from any animal species normally used for human/pet consumption. The composition of the jerky-like product produced by the invention further comprises potato flour (human consumption) or non-food grade potato flour (pet foods) and pregelatinized potato flours (food grade/nonfood grade) is the preferred ingredient to be used in the formulation of the jerky-like products.

The composition of the product produced by the alternative method of the invention further comprises a blended extrudate comprising a moisture content of the finished product of below 30% by weight after extrusion with a preferred moisture content between 10% and 20% in the extrudate; a fat content of below 5% by weight of finished product after extrusion with a preferred fat content between 2% and 4% in the extrudate; a protein content of approximately 19% after extrusion with a preferred protein content between 17–20% in the extrudate; and a caloric content of less than about 110 calories per ounce with a preferred range of between 105–115 calories per ounce of extrudate.

The composition of the jerky-like product further comprises leas than 35.6 mg of cholesterol for each 100 g of blended extrudate and with a fatty acid distribution of about 40% of saturated fatty acids, 51% of monounsaturated fatty acids, and 9% of polyunsaturated fatty acids in a product with similar product compositions.

In this alternative method of the invention, it is preferable that there be no expansion of the extrudate upon exiting the die opening. To accomplish a 1:1 expansion ratio, the screw used in making the jerky-like product preferably has a 3:1 compression ratio, rather that the 5:1 compression ratio screw utilized in the preferred method, for making an expanded/puffed product. The high mechanical shear and compression required for making expanded products is not needed in this alternative method.

The desired temperatures for extrusion using the alternative methodology are: (1) the feed section temperature should be maintained in the 50°–60° C. temperature range with a preferred temperature of 55° C.; (2) compression section temperature should be between 95°–105° C. range with a preferred temperature of 105° C.

An object of the invention is the provision of a unique process of making an expanded nutritious snack product utilizing both meat and starch sources.

Another object of the invention is the provision of the snack food product having excellent organoleptic properties.

Yet another object of the invention is the provision of a snack food product having increased shelf and storage life.

Still another object of the invention is the provision of a process of making a snack food wherein gelatinization, protein denaturation, and physical restructuring of the blended ingredients is promoted.

An advantage of the invention is the provision of moisture by the use of raw frozen or chilled meat products in the process of making the snack food product.

Another advantage of the invention is the use of pregelatinized potato flour, thereby enhancing steam formation and expansion of the extrudate.

Yet another advantage of the invention is the elimination of drying, rendering, or cooking of the meat products used in making the extrudate.

Another object of the invention is the provision of a unique process of the continuous production of a synthesized (proteinaceous, farinaceous, and seasonings) jerky-like product without using curing ingredients (nitrite, nitrate, erythorbates, and etc.), because the product is cooked in the extruder (210°-220° F.) and is shelf-stable without needing added preservatives when the product is dried to 10-20% moisture content in the finished product.

Another object of the invention is the provision of the expelled jerky product having the physical features of natural beef, turkey, and chicken jerky. Products may also be produced with other physical features—lozenges, chips and the like.

Another object of the invention is the provision of the jerky food product having excellent organoleptic and textural properties.

Yet another object of the invention is the provision of a jerky-like snack food product having increased shelf and storage life due to the product being fully cooked with a moisture content in the finished product of 10-20%.

Still another object of the invention is the provision of a process of making a jerky-like product wherein gelatinization, protein denaturation, and physical restructuring of the blended ingredients are promoted.

Yet another advantage of the invention is the elimination of the need for prior rendering, drying, or cooking of the meat ingredients used in making the jerky-type product.

Another object of the invention is the provision to take individual strips of jerky-like extrudate and tie them into "dog bones" for pets.

Yet another advantage of the invention is the production of jerky-like "dog bones" using the preferred amounts of proteinaceous and farinaceous materials will result in "dog bones" that will have a higher nutritive content, which will be more digestible than "dog bones" presently made from undigestible de-haired cow skins.

Other objects, advantages, and novel features, and further scope of applicability of the present invention will be set forth in part in the detailed description to follow, and in part will become apparent to those skilled in the art upon examination of the following, or may be learned by practice of the invention. The objects and advantages of the invention may be realized and attained by means of the instrumentalities and combinations particularly pointed out in the appended claims.

DESCRIPTION OF THE PREFERRED EMBODIMENTS

In the following descriptions, examples are given to illustrate the principles upon which the invention is based; however, it should be understood that the use of this invention is not limited to the examples presented.

Extrusion in the examples that follow may be performed with a conventional screw-type extruder that has a variable-pitch compression screw (5:1) turning at 135-150 revolutions per minute to force the flow of a blend of raw, frozen, finely ground meat (proteinaceous) and pregelatinized potato flour (farinaceous) through a barrel in an atmosphere of pressure, heat, and mechanical shear. Driven rotation of the screw forces the blend through the barrel as the feed section receives the blend from the feed hopper and mixes the ingredients into a dense material in the compression section. The increased friction between the blend, the barrel surface, and the screw induce heat and shear as the flight depth of the screw gradually decreases. These conditions promote gelatinization, protein denaturation and restructuring of the tactile components of the blend.

The physical properties of the extrudate are highly dependent upon extrusion processing conditions, raw materials, and the interrelationship of these factors. The amount of compression, heat, and expansion can be regulated by the size of the die nozzle, screw compression ratio, and the screw revolutions per minute (rpm), as well as the amount of auxiliary heating supplied by the electric heating elements of the extruder. In addition, the amount of moisture in the raw materials fed into the feed section of the extruder affects the expansion of the extrudate. If the moisture is too high, there is little expansion; whereas if the moisture is too low, excessive browning of the extrudate may occur, as well as jamming of the extruder.

The optimum moisture content of the raw materials of the preferred embodiment of the invention passing into and through the extruder comprises between 12% and 20% by weight water. In contradistinction thereto, the prior art suggests that 20-40% by weight moisture content is desirable; below 20% by weight water, excessive heating and jamming of the extruder may occur.

The preferred process of the invention, however, provides moisture by utilizing raw, frozen, finely comminuted meat products. Since no prior cooking, drying, or rendering of the meat products is required, and since such heating processes significantly reduce the ability of meat proteins to bind and hold moisture during extrusion, less moisture overall is required in the extrusion process of the present invention.

Further, since pregelatinized potato flour is also an ingredient of the extrudate blend, moisture is more easily absorbed and retained during the extrusion process.

Perhaps most importantly, since the meat is frozen, the latent heat of vaporization thereof delays actual release of moisture while heating during the extrusion process. Less overall moisture is thereby required during the extrusion process; the provision of frozen meat products and concomitant delay in moisture release due to latent heat of vaporization is believed to require far less moisture.

The process comprises combining unrendered, raw, non-dried, frozen, finely comminuted lean meat products with a pregelatinized potato flour, enhances the ability of the raw materials (particularly the meat ingredients) to pass through the extruder at a temperature of between 100° C. and 130° C. and at a moisture level between 12% and 20% by weight and still possess sufficient steam formation to bring about the desired expansion of the extrudate as it exits the die orifice without burning the extrudate. The use of the pregelatinized potato flour also ensures that the extrudate which exits the die orifice is entirely expanded without the need of subsequent frying or drying. Extrudate may then be cut to the desired lengths by altering the speed of the cutting device. Flavors, oil, spices, vitamins, and the like, may be topically applied before packaging and storing.

As an alternative to freezing, the fresh proteinaceous material may merely be chilled to some temperature at or below the freezing point of such proteinaceous material. Correspondingly, much less heat and pressure would thereby be required during the extrusion process to produce the desired expansion of the extrudate.

EXAMPLE 1

Mechanically separated fresh beef that had passed through a plate with 0.46 mm holes of a Beehive ® deboner was frozen or chilled. While still frozen or chilled, the mechanically separated beef was ground through a 0.38 cm plate using a meat grinder and stored at 0°–5° C. until immediately before blend preparation. Just before blend preparation, the frozen or chilled meat product was finely comminuted to obtain small particle size. Subsequently, the finely comminuted raw frozen or chilled meat was mixed with pregelatinized potato flour, with and without salt, to yield the following mixture with the following composition by weight percentages:

| | |
|---|---|
| Raw, mechanically separated beef, finely chopped, frozen | 13.0% |
| Pregelatinized potato flour | 86.0% |
| Salt | 1.0% |

After the mixture was blended, it was immediately fed into a 1.9 cm barrel size single screw extruder (C. W. Brabender, Model 2003) where the mixture was heated and compressed to result in gelatinization. The feed section was maintained at 25° C. by air cooling, while the compression and metering sections were set and maintained at 130° C. The product exited the die nozzle at approximately 110° C. The screw of the extruder was rotated at 130 rpm and had a 5:1 compression ratio to provide maximum shear pressure to result in adequate expansion of the extrudate. The extrudate was cut into portions that were one inch in length and had an expansion ratio (cross-sectional area of extrudate ÷ cross-sectional area of the die orifice) of 3.97 to 4.41 and a density (g/ml) of 0.09. The resulting product requires no further puffing or drying before being flavored, resulting in a snack food alone or with the desired flavor applied topically.

EXAMPLE 2

The procedure of Example 1 was repeated, except that in lieu of mechanically separated beef, a mixture of fresh lean beef shank (10.4%) meat and 2.6% by weight of fat was used. Prior to comminution, the raw product was frozen or chilled and prepared, similarly as in Example 1, and processed through the single screw extruder.

| | |
|---|---|
| Raw lean beef shank meat, finely chopped and frozen | 10.4% |
| Beef fat, finely chopped and frozen | 2.6% |
| Pregelatinized potato flour | 86.0% |
| Salt | 1.0% |

The resulting extrudate was similar in color, expansion, density, and flavor to the product in Example 1.

EXAMPLE 3

The procedure of Example 1 was repeated, serially, except that in lieu of mechanically separated beef, a mixture of fresh, fat-reduced beef trimmings (88% lean, 12% fat) was used. The mixture contained the following composition by weight percentages:

| | |
|---|---|
| Raw fat-reduced beef trimmings, finely chopped, frozen or chilled | 13.0% |
| Pregelatinized potato flour | 86.0% |
| Salt | 1.0% |

The product which resulted was similar to the product of Examples 1 and 2, but lacked the same degree of expansion.

The resulting snack food exhibited significant protein quality. A bioassay study with rats revealed that extrudates containing blended salt caused diarrhea; accordingly, in subsequent tests, salt was applied topically after extrusion and cutting, rather than incorporating it in the blend prior to extrusion.

As shown by Table I, all of the essential amino acids are present in the extrudate. The percentage of the essential amino acids present in the snack food was 72% of the human requirement.

TABLE I

| Amino Acid | NMSU Snack Food (1990) | Human Requirement |
|---|---|---|
| Isoleucin | 2.7 | 4.0 |
| Leucine | 4.7 | 7.0 |
| Lysine | 4.0 | 5.5 |
| Methionine | 1.5 | 3.5 |
| Phenylalanine | 3.2 | 6.0 |
| Threonine | 3.2 | 4.0 |
| Tryptophane | 0.7 | 1.0 |
| Valine | 4.2 | 5.0 |
| Histidine | 2.4 | 1.4 |
| Total | 27.6% | 38.4% |

Additionally, the extruded snack food is as follows in Table II:

TABLE II

| Item | Amount |
|---|---|
| Serving Size | 28.4 g (1 oz.) |
| Calories[c] | 103 |
| Protein[a,d] | 3.2 g |
| Fat[a,d] | 1.1 g |
| Carbohydrate[a] | 20 g |
| Cholesterol[b] | <1 mg/100 g |
| Sodium[a,c] | 128 mg |
| Iron[a,c] | 1 mg |
| Calcium[a,c] | 76 mg |

[a]New Mexico Department of Agriculture, Las Cruces, New Mexico
[b]National Environmental Testing, Inc., Chicago, Illinois
[c]Nutrition Laboratory, Department of Animal and Range Sciences, New Mexico State University, Las Cruces, New Mexico
[d]Ruben/Prepared Foods, Inc., U.S.D.A. approved laboratory, Santa Teresa New Mexico Further, the fatty acid distribution of the snack food extrudate is as follows:

TABLE III

| Type of Fatty Acids | % of Total Fat |
|---|---|
| Saturated[a] | 35.2 |
| Monounsaturated[a] | 62.1 |
| Polyunsaturated[a] | 2.7 |

[a]National Environmental Testing, Inc., Chicago, Illinois

Other significant tabular test data that are largely self-explanatory are the following:

TABLE IV

Caloric Distribution of the Snack Food[a]
(Nutrition Laboratory, Department of Animal and Range Sciences, New Mexico State University Las Cruces, New Mexico)

| Item | Calories |
|---|---|
| Protein | 13 |
| Fat | 10 |
| Carbohydrate | 80 |

[a]Each gram of carbohydrate and protein = 4 calories, while each gram of fat = 9 calories.

TABLE V

Microbiological Count of the Snack Food
New Mexico State University
Ruben/Prepared Foods, Inc., U.S.D.A., Approved Laboratory
Santa Teresa, New Mexico

| | Count | | |
|---|---|---|---|
| Microorganism | Day 1 | Day 30 | Day 60 |
| Standard plate count | <100/g | <100/g | <100/g |
| Coliform | <10/g | <10/g | <10/g |
| Staphylococcus aureus | <10/g | <10/g | <10/g |
| Salmonellae | Negative | Negative | Negative |

TABLE VI

Influence of Storage for 30 and 60 Days Upon the Shear Strength of an Expanded Snack Food
(New Mexico State University - 1990)

| | Storage Period | | | |
|---|---|---|---|---|
| Product | Day 1 (n = 240) | Day 30 (n = 240) | Day 60 (n = 240) | Mean |
| Snack with Salt | 10.27 | 15.08 | 17.01 | 14.10 |
| Snack without Salt | 9.33 | 12.35 | 12.93 | 11.54 |
| Mean | 9.77 | 13.72 | 14.97 | |

TABLE VII

Thiobarbituric Acid (TBA) as a Measure of Oxidative Rancidity in the snack Food
(Pope Testing Laboratory, Dallas, TX)

| Sample No. | Type of Snack | Mg Malonaldehyde/1000 g of product | | |
|---|---|---|---|---|
| | | 7/27/90 | 8/27/90 | 9/27/90 |
| 1 | Unflavored | 0.8 | 0.6 | 0.4 |
| 2 | Unflavored | 0.8 | 0.5 | 0.2 |
| 3 | Unflavored | 0.8 | 0.6 | 0.3 |
| 4 | Unflavored | 0.9 | 0.7 | 0.3 |
| 5 | Flavored | 0.6 | 0.3 | 0.6 |
| 6 | Flavored | 0.8 | 0.4 | 0.4 |
| 7 | Flavored | 0.7 | 0.3 | 0.3 |
| 8 | Flavored | 0.7 | 0.4 | 0.3 |

TABLE VIII

Proximate Analyses of Raw Materials Used in Producing the Snack Food
(New Mexico State University)

| Item, % | Mechanically Separated Beef #1 | Mechanically Separated Beef #2 | Boneless Shank Beef | Potato Flour #1 | Potato Flour #2 |
|---|---|---|---|---|---|
| Protein | 17.5 | 15.5 | 18.1 | 10.5 | 9.5 |
| Fat | 27.3 | 20.0 | 8.2 | 1.2 | 1.4 |
| Fiber | 0.42 | 0.10 | 0.86 | 1.8 | 2.4 |
| Moisture | 52.9 | 61.2 | 53.1 | 6.0 | 5.6 |
| Ash | 2.4 | 3.5 | 3.0 | 4.0 | 3.7 |
| Iron | 0.010 | 0.02 | 0.014 | 0.00265 | 0.0027 |
| Calcium | 1.67 | 3.5 | 0.01 | 0.035 | 0.038 |
| Sodium | 0.33 | 0.44 | 0.38 | 0.06 | 0.048 |

Thus, the invention provides a relatively nutritious, tasty snack food that has, inter alia, good expansion characteristics (approximately 4:1), relatively low caloric content, good storage capability, and low microbiological organism count.

The preceding examples can be repeated with similar success by substituting the generically or specifically described reactants and/or operating conditions of this invention for those used in the preceding examples.

In the alternative embodiment of the invention, extrusion may be performed with a conventional single-screw or double-screw extruder that has adequate means of controlling temperature, screw speed and screw compression. The illustrative examples that follow were performed with a conventional single-screw extruder that has a variable-pitch compression screw turning at approximately 160 revolutions per minute to force the flow of a blend of ground/chopped meat (proteinaceous), pregelatinized potato flour (farinaceous), and seasonings through an extruder barrel in an atmosphere of pressure, heat, and mechanical shear. The need for a dramatic increase in pressure and mechanical shear is not needed, as is the case with the preferred expanded/puffed extrudate, when making the alternative jerky-type product.

With the alternative embodiment, driven rotation of the screw forces the blend through the barrel as the feed section receives the blend from the feed hopper and mixes the ingredients into a dense material in the compression and metering sections. The friction between the blend, the barrel surface, the screw, and the added heat results in gelatinization, protein denaturation and restructuring of the tactile components of the blend.

The physical properties of the extrudate are highly dependent upon extrusion processing conditions, kind and amount of the raw materials, and the interrelationship of these factors. The amount of compression, shear, friction, heat and expansion can be regulated by the size and configuration of the die orifice, screw compression ratio, and the revolutions of the screw per minute (rpm), as well as, the amount of auxiliary heating supplied by the electric heating elements of the extruder. In addition, the ratio of proteinaceous/farinaceous materials fed into the feed section of the extruder affects the texture, cohesion, flexibility, thickness, and formability of the extrudate. If the proteinaceous materials (meat) are too high (>65%) the extrudate lack the form, texture, thickness and flexibility of a jerky product; whereas if the proteinaceous materials are too low (<35%) the extrudate is too thick, rubbery, and tough to simulate real beef jerky.

The optimum moisture content of the raw materials of the alternative embodiment of the invention passing into and through the extruder comprises 30–35% for the jerky-like product for human consumption, and 15–25% moisture in the strips used for making a "dog bone" pet snack product. The extruded flat strips are about 40 mm in width and 2 mm in thickness; however, the width and thickness of the strips may be changed by resetting the opening of the ribbon die orifice to the desired setting. These strips need no additional forming-/rolling of the extrudate to obtain the desired thickness (as frequently encountered in existing art).

Subsequent to the cooked extrudate exiting the ribbon die orifice, the extrudate, depending upon formulation, contains about 20-30% moisture in the extrudate. This product is pliable, flexible, and is of the desired thickness, but after cooling to ambient temperature the product becomes less flexible, stiffer, harder and resembles jerky in its physical attributes. Accelerated setting of the product can be accomplished by drying in a hot air, conventional oven to remove additional moisture (down to 10-15%). A system of conveyors may be utilized to move the extrudate to cutting, chilling, packaging, and shipping locations.

In the following description of the alternative embodiment of the invention, examples are given to illustrate the inventive principles; use of the invention is not limited to the examples. Extrusion in the examples that follow may be performed with a conventional single-screw or double-screw extruder that has a variable pitch compression screw with a compression ratio of between 2.5 to 1 and 3.5 to 1, preferably 3 to 1. The extruder preferably turns at between 160 and 180 revolutions per minute to force the flow of a blend of raw, preferably frozen, finely ground meat of any species (proteinaceous) and starches (farinaceous) with or without seasonings/flavorings through a barrel in an atmosphere of pressure, heat, and mechanical shear. Rotation of the screw moves the blend through the barrel and from the feed section to the blend section. The increased friction between the blend, the barrel surface and the screw induces heat and shear as the flight depth of the screw decreases (preferably at 3:1 compression). These conditions promote gelatinization, protein denaturation, and restructuring of the tactile components of the blend.

The physical properties of the extrudate are highly dependent upon the extrusion processing conditions, ingredients, and barrel temperature. Compression and heat can be regulated by the size of the extruder orifice, the screw compression ratio, the screw r.p.m., and the amount of auxiliary heating supplied by electric or steam heating elements within the extruder. Additionally, the amount of heat supplied in the feeder zone of the extruder is important, inasmuch as temperatures in this section exceeding 60° C. tends to result in poor formation of extrudate upon exiting the die orifice. Also, screws with compression ratios in excess of 1:3.5 generate an expanded product lacking the tough, chewy consistency of jerky.

The alternative embodiment of the invention, like the preferred embodiment, utilizes both meat and starch components as the main ingredients. In the case of the jerky-like product, however, the seasonings and flavorings are added to the raw ingredients prior to being fed into the extruder. Alternatively, additional seasonings may be applied to the extrudate, which has a tacky surface prior to the drying period (which period may be required to attain the desired moisture content of 10-20% in the final product). The alternative process and composition also preferably utilizes pregelatinized potato flour, which ensures that the extrudate exiting the ribbon die orifice requires no additional frying; the product needs only to be dried using hot air to remove excess moisture in the extrudate.

The formed extrudate may be expelled from a number of ribbon dies connected to the head of the extruder. A system of conveyors can be utilized to carry the extrudate to locations where it is cut to the desired length and width. Subsequently, oils, flavors and seasonings may be topically applied to the extrudate prior to moving it to the drying cycle; after the jerky-like product has obtained the desired moisture content, it may be chilled and packaged.

EXAMPLE 4

This example of the preparation of the alternative jerky-like embodiment of the invention used frozen, partially defatted chopped beef (PDCB), a product derived from the low-temperature (120° F.) rendering of beef. The PDCB was ground through a 0.38 cm plate using a meat grinder and stored at 0°-5° C. until immediately before blend preparation. The PDCB was finely comminuted to obtain small particle size. Subsequently, the finely comminuted PDCB was mixed with pregelatinized potato flour and with seasonings to yield the following mixture with the following composition:

CHART A

|  | WO/Seasoning | W/Seasoning |
|---|---|---|
| Raw, finely chopped, frozen/chilled partial defatted chopped beef | 45% | 45% |
| Pregelatinized potato flour | 55% | 47% |
| Seasonings |  | 8% |

After the mixture was blended it was immediately fed into a 1.9 cm barrel size single screw extruder (C. W. Brabender, Model No. 2003) where the mixture was heated and compressed to cause gelatinization and cooking of the raw ingredients. The mixture was cooked in the extruder using the following measurements:

CHART B

| Zone 1 (Feed) | Zone 2 (Compression) | Zone 3 (Metering) | RPM |
|---|---|---|---|
| 51° C. | 100° C. | 109° C. | 160 |
| 81° C. | 110° C. | 110° C. | 160 |

The extruder feed section was maintained in the 50°-60° C. temperature range to obtain a product with a stable, desirable form upon exiting the ribbon die orifice. (When heated to 81° C. in the feed zone, the extrudate became very soft and puffy, unable to hold a desirable jerky shape upon expulsion from the ribbon die.) The temperature in the extruder compressor and metering zones was maintained at 110° C. The extruder screw was rotated at 160 rpm and the screw had a 3:1 compression ratio to provide the necessary pressure to force the extrudate through the die orifice. The extrudate exiting the orifice was approximately the same size as the orifice itself. The extrudate was cut into strips of the desired length and width. The strips were thereafter dried in a Blodgette ® convectional oven (forced air) at 120° F. until the moisture range was within the range of 10% to 20%.

EXAMPLE 5

The procedure of Example 4 was repeated, except that in lieu of PDCB, an equal proportion of a mixture of lean, beef shank meet was used. The resulting extrudate was darker in color than the PDCB product and possessed a tougher, chewier consistency of jerky than the PDCB product. The composition of the jerky-like product, as determined by the Animal and Range Sciences Nutrition Laboratory of New Mexico State University, was as follows:

CHART C

| SAMPLE | IDENTIFICATION | % MOISTURE | PROTEIN | (FAT) | FIBER |
|---|---|---|---|---|---|
| #1 | 35% Meat | 19.07 | 17.79 | 1.95 | 0.00 |
| #2 | 40% Meat | 18.32 | 18.10 | 2.30 | 0.53 |
| #3 | 45% Meat | 17.57 | 18.42 | 2.57 | 0.34 |

Although the invention has been described with reference to these preferred embodiments, other embodiments can achieve the same results. Variations and modifications of the present invention will be obvious to those skilled in the art and it is intended to cover in the appended claims all such modifications and equivalents. The entire disclosures of all applications, patents, and publications cited above, and of the corresponding application are hereby incorporated by reference.

What is claimed is:

1. A method of preparing a jerky-like food product, comprising the steps of:
    (a) freezing proteinaceous material;
    (b) finely comminuting the proteinaceous material;
    (c) blending the comminuted frozen proteinaceous material with pregelatinized farinaceous material to create a mixture; and
    (d) extruding while heating and pressurizing the mixture through a screw extruder having a compression ratio in the range between 2.5:1 and 3.5:1, thereby fully cooking the mixture.

2. The method of claim 1 wherein the step of freezing proteinaceous material comprises the steps of mechanically preparing and freezing selected meat products.

3. The method of claim 2 wherein the step of mechanically preparing selected meat products comprises the step of deboning selected beef products.

4. The method of claim 2 wherein the step of mechanically preparing selected meat products comprises the step of mixing lean meat and fat.

5. The method of claim 2 wherein the step of mechanically preparing selected meat products comprises the step of providing fat-reduced beef trimmings.

6. The method of claim 1 wherein the step of blending the comminuted proteinaceous material with farinaceous material comprises creating a blend of proteinaceous material with farinaceous material that is between 40% and 80% farinaceous material by weight.

7. The method of claim 1 wherein the step of blending the comminuted proteinaceous material with farinaceous material comprises creating a blend of proteinaceous material with farinaceous material that is between 65% and 80% farinaceous material by weight.

8. The method of claim 1 wherein the step of blending the comminuted proteinaceous material with farinaceous material comprises creating a blend of proteinaceous material with farinaceous material that is between 40% and 70% farinaceous material by weight.

9. The method of claim 1 wherein the step of heating the mixture comprises the step of maintaining the temperature of a feed section of the extruder within the range between 50 degrees and 60 degrees centigrade.

10. The method of claim 9 wherein the step of heating the mixture further comprises the step of maintaining the temperature of a compression section of the extruder within the range between 95 degrees and 105 degrees centigrade.

11. The method of claim 1 wherein the step of heating the mixture comprises the step of maintaining the temperature of a feed section of the extruder at 55 degrees centigrade.

12. The method of claim 11 wherein the step of heating the mixture further comprises the step of maintaining the temperature of a compression section of the extruder at 105 degrees centigrade.

13. The method of claim 1 wherein the step of blending the comminuted frozen proteinaceous material with farinaceous material further comprises the step of seasoning the mixture.

14. The method of claim 1 wherein the step of extruding the mixture comprises the step of extruding the mixture through a screw extruder having a compression ratio of 3:1.

15. The method of claim 1 wherein the step of extruding the mixture through a screw extruder further comprises the step of turning the extruder at between 160 and 180 revolutions per minute.

* * * * *